Aug. 29, 1967  D. B. CURRY  3,337,936
MILLING TOOL FOR MILLING OR CUTTING
OBJECTS IN A WELL BORE
Filed Feb. 13, 1967
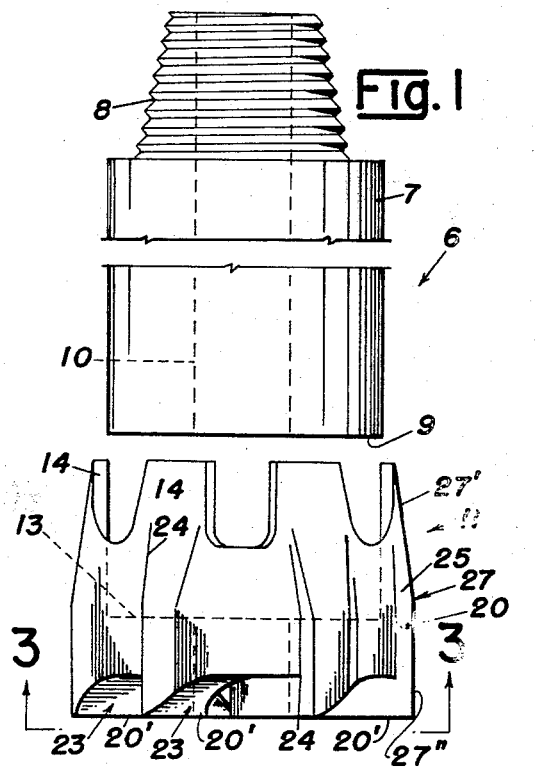
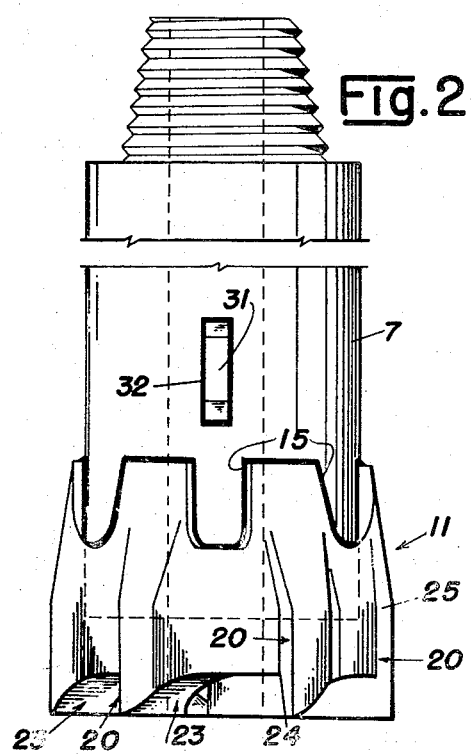
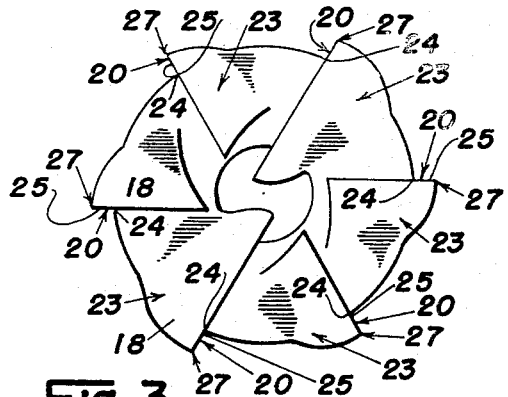
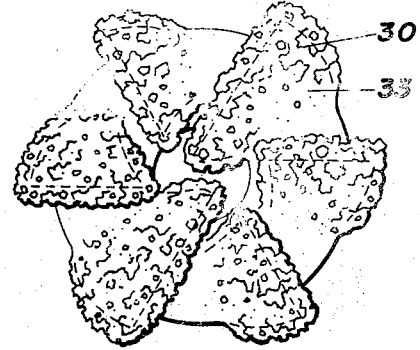
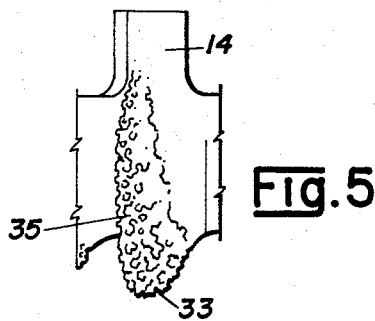
DAVID B. CURRY
INVENTOR.
BY Hayden & Pravel
ATTORNEYS United States Patent Office 3,337,936
Patented Aug. 29, 1967

3,337,936
MILLING TOOL FOR MILLING OR CUTTING
OBJECTS IN A WELL BORE
David B. Curry, 2015 E. Main St.,
New Iberia, La. 70560
Filed Feb. 13, 1967, Ser. No. 615,426
1 Claim. (Cl. 29—103)

ABSTRACT OF THE DISCLOSURE

A milling tool including a milling head and a tubular body adapted to receive the milling head, the milling head having a configuration which permits it to be permanently secured to the tubular body during use and which includes a blade cutter arrangement to obtain maximum milling or cutting surface, the milling head being easily and quickly removable from the tubular body when the milling head is worn out.

BACKGROUND OF THE INVENTION

(1) Field of the invention

The present invention relates to a tool that is commonly referred to as a "milling tool" that is adapted to be secured in a string of pipe and lowered into a well bore and for cutting objects in the well bore such as packers, metallic objects, or other objects in the well bore.

The milling tool of the present invention is formed of two separate pieces one of which is a tubular body or mandrel having a bore therethrough and the other being a milling head having a particular configuration which enables it to be secured in place on the mandrel or tubular body by welding during the milling operation to prevent disconnection therebetween, which weld may be removed when the milling head becomes worn out to enable replacement thereof.

The milling head is also provided with a configuration of a plurality of members thereon to provide cutting edges and surfaces that may be coated with a suitable material such as sintered, crushed tungsten carbides in order to effect the milling or cutting operation.

The arrangement of the members is such that a substantial cutting surface is provided to more effectively accomplish the function for which the tool is designed.

(2) Description of the prior art

With milling tools of the prior art, the cutting head and tubular member are integrally formed, which requires the user to purchase both parts when the milling or cutting head is worn out, and also requires a user to have a plurality of mandrels for each size of milling head that may be desired. Additionally, the prior art does not provide an arrangement as desired herein whereby a milling or cutting head may be initially secured by welding to the mandrel and thereafter the two may be easily separated when necessary, nor does the prior art provide a tubular member which can carry or support any one of a plurality of different sizes of milling heads and which may be mounted thereon with a minimum of effort and which can be removed for replacement of other sizes of milling heads or for replacement of the milling head when it becomes worn.

The present invention overcomes these problems in that the milling head and tubular support therefor may be separated and a different size milling head placed on the same tubular body and securely positioned thereon to effect the cutting or milling operation.

Also, the present invention provides an arrangement of cutting surfaces or members on the mill to provide a maximum cutting surface to effect the milling operation.

SUMMARY OF THE INVENTION

The present invention is directed to a milling head arrangement which is constructed so that it provides a maximum surface for welding on a tubular member and also provides an arrangement of members to effect the milling operation wherein a maximum cutting area is provided.

An object of the present invention is to provide a milling tool wherein the cutting head is provided at one end with a plurality of circumferentially spaced fingers or projections that are adapted to telescopically fit over the end of a tubular member and the milling head then welded in position on the tubular member by welding the edges of the fingers to the tubular body. This arrangement provides a maximum amount of welding contact between the milling head and the tubular body upon which it is supported.

Still another object of the present invention is to provide a milling tool incorporating a tubular body and a cast milling head wherein the milling head is provided with a plurality of members at one end thereof having leading and trailing edges, the lowermost edges of the leading edges extending at least partially across the bottom of the milling head and arranged relative to a central bore through the milling head so that a line extended along such lowermost edges and across the central bore intersects the bore on a chord and wherein the members include a trailing edge having a surface extending upwardly in a generally arcuate fashion to the next adjacent innermost edge of the leading surface or edge. The leading edge is also formed to provide a surface that projects outwardly of the body of the milling head and longitudinally therealong so that a cutting material such as sintered, crushed tungsten carbides may be placed thereon in order to effect the milling operation. The leading and trailing edges of each member form a lowermost edge at their juncture.

Other objects and advantages of the present invention will become apparent from the following description and drawings wherein:

FIG. 1 is an elevational view showing the tubular member in broken elevation prior to telescopically connecting it and the milling head together;

FIG. 2 is a view somewhat similar to FIG. 1 but showing the milling head welded in position on the tubular body and centralizers provided thereon for centralizing the milling tool;

FIG. 3 is an end view on the line 3—3 of FIG. 1 to more particularly bring out the arrangement of the members on the bottom of the milling head;

FIG. 4 is an end view similar to FIG. 3 but illustrating the milling head after the sintered, crushed tungsten carbides have been placed thereon; and FIG. 5 is a view showing a layer of sintered, crushed tungsten carbide particles along the longitudinal extent of the leading edges of one member internally cast on the milling head.

DESCRIPTION OF THE PREFERRED EMBODIMENT

The milling tool of the present invention is referred to generally by the reference numeral 6 and is shown as including a tubular body or mandrel 7 which is provided at one end with threads 8 for engagement in a well string so that it may be lowered into a well bore.

The other end 9 of the mandrel or body 7 is substantially flat as illustrated in FIG. 1, and the body 7 is provided with a bore shown in dotted line at 10 for circulation of fluids during the milling operation in a manner well known in the art.

An integrally cast milling head is represented generally by the numeral 11 and is shown as being provided with a recess 12, which recess 12 is of substantially the same diameter as the tubular mandrel 7 so that the tubular mandrel 7 may be telescopically received within the recess 12 to connect the mandrel 7 and milling head 11 together as shown in FIG. 2. The recess 12 is provided with a flat bottom 13 for abutting the flat bottom 9 of the mandrel or tubular body 7 when they are telescopically engaged and a plurality of circumferentially spaced projections or fingers 14 is provided on one end of the milling or cutting head 11 and forms an extension of the recess 12. The arrangement of the projections or fingers 14 provides more surface contact for welding the milling head 11 on the mandrel 7.

For example, it is desired to mount the milling head 11 on the mandrel 7, a weld as represented at 15 which extends completely around the edge of each of the projections or fingers 14 so that a maximum extent of weld is provided between the milling head 11 and mandrel 7 to more securely position the milling head 11 in position on the mandrel 7 during milling operations.

The integrally cast milling head includes a central bore better illustrated at 16 in FIG. 3 which communicates with the bore 10 in the mandrel 7 for discharge of fluid therefrom in a manner well known in the art.

A plurality of members 18 is integrally formed on the other end of the milling head body 11 and extends longitudinally thereof in a manner as will be described in more detail.

The members 18 each include a leading edge or surface represented generally at 20 and a trailing edge or surface represented generally at 23, the trailing edge 23 of each member 18 extending upwardly in a generally arcuate fashion to the next adjacent innermost edge 24 of each of the leading surfaces 20. The lower juncture of the leading and trailing edges forms a lower bottom or lowermost edge 20' on each member which lies in a common, horizontal plane as more clearly seen in FIG. 1 of the invention prior to the application of the sintered, crushed tungsten carbides thereto.

The leading surface or edge 20 of each member 18 provides a surface 25 that extends outwardly of the milling head 11 as shown in FIG. 3 of the drawings and terminates in the edge 27 that extends longitudinally of the milling head 11 from adjacent the projections or fingers 14 downwardly to the lowermost edge 20' of each member 18. It will be noted that the longitudinally extending edge 27 is tapered inwardly as shown at 27' adjacent the projections 14, and then extends substantially vertically downwardly as shown at 27" to the lowermost edge 20'.

After the milling head 11 has thus been integrally cast, a coating of cutting material of sintered, crushed tungsten carbide particles as represented by the numeral 30 in FIG. 4 may be applied to each member 18 so as to coat or apply a layer to the leading edge 20 approximately ⅜" to ½" thick with sintered, crushed tungsten carbide particles as indicated at 30 in FIG. 4. Similarly, the lowermost edge 20' is built up about ⅜" to ½", such application of the sintered, crushed tungsten carbides being made in a manner well known in the art. The trailing surface 23 has applied thereto a similar coating partially along its surface as shown at 33, but it is only approximately ⅛" to ¼" in thickness. The coating of carbides on the leading edge 20 extends longitudinally therealong as shown at 35 in FIG. 5.

Thus, the leading edge or cutting edge 20 of milling head 11 is substantially covered from adjacent the members 14 downwardly and on the bottom thereof along the edges 20' as well as a portion of the trailing surface 23 to provide a maximum cutting surface of the milling tool.

In using the present invention, the mandrel or tubular body 7 is connected into a well string at the lower end thereof prior to lowering into the well bore, and, of course, the milling head 11 of a desired size is affixed to the tubular member or mandrel 7 by welding as previously described. The tool is then lowered into the well bore and the milling operation performed whether it be to cut a rubber, metal, or other object in the well bore.

It can be appreciated that any size milling head 11 may be used with the tubular mandrel 7 so that the mandrel 7 is interchangeable with various sizes of milling head 11, and also the construction of the present invention by reason of the spaced arrangement of the fingers or projections 14 provides a maximum amount of welding area for engaging the milling head 11 on the tubular member 7 to hold it in position during use.

When it is desired to change milling heads to another size or to replace milling heads when they become worn, the weld 15 may be turned off in a manner well known in the art and a new head applied thereto.

Centralizers as represented by the numeral 31 may be spaced at suitable circumferentially spaced points on the body 7 and engaged thereon by means of welding as represented at 32, and it has generally been found that three of such members serve the purpose quite well.

Broadly, the present invention relates to a milling tool wherein the milling head may be replaced with a minimum of time and effort and which is constructed and arranged to provide a maximum amount of area of contact for engaging the milling tool on the tubular member and a maximum amount of area for positioning sintered, crushed tungsten carbides thereon to effect the milling operation.

What is claimed is:

A milling tool for connection in a well string for cutting objects in a well bore including:
- (a) an elongated, hollow tubular body;
- (b) one end of said body having a threaded portion for engagement in a well string;
- (c) the other end of said body having substantially a flat face thereon;
- (d) a cast milling head adapted to be telescopically received on said other end;
- (e) said milling head having a recess in one end thereof, said recess having a flat bottom for abutting the flat face on said other end of said body when said body and milling head are telescopically engaged;
- (f) a plurality of circumferentially spaced fingers extending longitudinally of said one end of said milling head, the inner surface of each of said fingers forming an extension of said recess;
- (g) said cast milling head having a central bore extending from the recess through the other end thereof;
- (h) a plurality of members integrally formed on said other end of said milling head and each having a leading edge and a trailing edge to form a surface that extends outwardly of said milling head and the juncture of the leading and trailing edges forming a lowermost edge; the outwardly extending surface extends longitudinally of said milling head from adjacent said fingers to the lowermost edge of said milling head;

(i) said lowermost edges of the members extending at least partially across said other end of said milling head and in a common plane so that a line drawn along said lowermost edge of each member forms a chord which intersects said central bore;
(j) said trailing edge extending from said lowermost edge generally arcuately upwardly to the next adjacent leading edge at its innermost edge;
(k) means for securing said head on said body, said means comprising a weld which extends along the edge of each of said circumferentially spaced fingers to thereby secure said head on said tubular body; and
(l) a milling material of sintered, crushed tungsten carbides coating said members on said leading edge along its longitudinal extent, said lowermost edge and at least a part of said trailing edge of each member for cutting objects in a well bore.

References Cited

UNITED STATES PATENTS

| | | | |
|---|---|---|---|
| 1,923,488 | 8/1933 | Howard | 29—105 X |
| 3,106,766 | 10/1963 | Chadderdon | 29—103 |
| 3,147,536 | 9/1964 | Lamphere | 29—103 X |

HARRISON L. HINSON, *Primary Examiner.*